(12) United States Patent
Kononenko et al.

(10) Patent No.: US 11,908,241 B2
(45) Date of Patent: Feb. 20, 2024

(54) METHOD FOR CORRECTION OF THE EYES IMAGE USING MACHINE LEARNING AND METHOD FOR MACHINE LEARNING

(71) Applicant: Skolkovo Institute Of Science And Technology, Moscow (RU)

(72) Inventors: Daniil Sergeyevich Kononenko, Moscow (RU); Victor Sergeyevich Lempitsky, Moscow (RU)

(*) Notice: Subject to any disclaimer, the term of this patent is extended or adjusted under 35 U.S.C. 154(b) by 238 days.

(21) Appl. No.: 17/114,925

(22) Filed: Dec. 8, 2020

(65) Prior Publication Data
US 2021/0209330 A1 Jul. 8, 2021

Related U.S. Application Data

(63) Continuation of application No. 15/567,365, filed as application No. PCT/RU2016/000118 on Mar. 3, 2016, now Pat. No. 10,891,478.

(30) Foreign Application Priority Data

Mar. 20, 2015 (RU) .......................... RU2015109868

(51) Int. Cl.
*G06V 40/18* (2022.01)
*G06N 20/00* (2019.01)
(Continued)

(52) U.S. Cl.
CPC .............. *G06V 40/193* (2022.01); *G06N 5/01* (2023.01); *G06N 20/00* (2019.01); *G06N 20/20* (2019.01);
(Continued)

(58) Field of Classification Search
None
See application file for complete search history.

(56) References Cited

U.S. PATENT DOCUMENTS 1,128,979 A 2/1915 Hess
1,970,311 A 8/1934 Ives
(Continued)

FOREIGN PATENT DOCUMENTS

CN 1142869 A 2/1997
CN 1377453 A 10/2002
(Continued)

OTHER PUBLICATIONS

3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
(Continued)

*Primary Examiner* — Leon Viet Q Nguyen
(74) *Attorney, Agent, or Firm* — Boyle Fredrickson S.C.

(57) ABSTRACT

The present invention refers to automatics and computing technology, namely to the field of processing images and video data, namely to correction the eyes image of interlocutors in course of video chats, video conferences with the purpose of gaze redirection. A method of correction of the image of eyes wherein the method obtains, at least, one frame with a face of a person, whereupon determines positions of eyes of the person in the image and forms two rectangular areas closely circumscribing the eyes, and finally replaces color components of each pixel in the eye areas for color components of a pixel shifted according to prediction of the predictor of machine learning. Technical effect of the present invention is rising of correction accuracy of the image of eyes with the purpose of gaze redirection, with decrease of resources required for the process of handling a video image.

13 Claims, 4 Drawing Sheets

(51) Int. Cl.
  *G06T 11/60* (2006.01)
  *G06N 20/20* (2019.01)
  *G06V 40/19* (2022.01)
  *G06N 5/01* (2023.01)
  *G06T 7/70* (2017.01)
  *G06N 3/04* (2023.01)

(52) U.S. Cl.
  CPC ............... *G06T 7/70* (2017.01); *G06T 11/60* (2013.01); *G06V 40/19* (2022.01); *G06N 3/04* (2013.01)

(56) References Cited

U.S. PATENT DOCUMENTS

| | | |
|---|---|---|
| 2,133,121 A | 10/1938 | Stearns |
| 2,247,969 A | 7/1941 | Stewart |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,050,946 A | 9/1991 | Hathaway et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,499,303 A | 3/1996 | Hundt et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,172,723 B1 | 1/2001 | Inoue et al. |
| 6,199,995 B1 | 3/2001 | Umemoto et al. |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,283,858 B1 | 9/2001 | Hayes, Jr. et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,556,196 B1 | 4/2003 | Blanz et al. |
| 6,654,156 B1 | 11/2003 | Crossland et al. |
| 6,663,254 B2 | 12/2003 | Ohsumi |
| 6,677,980 B1 | 1/2004 | Jeon |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 | 9/2004 | Jones et al. |
| 6,801,243 B1 | 10/2004 | Berkel |
| 6,806,898 B1 | 10/2004 | Toyama et al. |
| 6,816,158 B1 | 11/2004 | Lemelson et al. |
| 6,825,985 B2 | 11/2004 | Brown et al. |
| 6,847,488 B2 | 1/2005 | Travis |
| 6,859,240 B1 | 2/2005 | Brown et al. |
| 6,867,828 B2 | 3/2005 | Taira et al. |
| 6,919,892 B1 | 7/2005 | Cheiky et al. |
| 6,975,755 B1 | 12/2005 | Baumberg |
| 7,001,058 B2 | 2/2006 | Inditsky |
| 7,058,252 B2 | 6/2006 | Woodgate et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,475 B2 | 5/2007 | Woodgate et al. |
| 7,227,567 B1 | 6/2007 | Beck et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,524,053 B2 | 4/2009 | Lipton |
| 7,528,893 B2 | 5/2009 | Schultz et al. |
| 7,545,429 B2 | 6/2009 | Travis |
| 7,614,777 B2 | 11/2009 | Koganezawa et al. |
| 7,697,735 B2 | 4/2010 | Adam et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,798,698 B2 | 9/2010 | Segawa |
| 7,798,699 B2 | 9/2010 | Laitinen et al. |
| 7,826,668 B1 | 11/2010 | Zaklika et al. |
| 7,864,253 B2 | 1/2011 | Tajiri |
| 8,016,475 B2 | 9/2011 | Travis |
| 8,144,153 B1 | 3/2012 | Sullivan et al. |
| 8,199,152 B2 | 6/2012 | Sullivan et al. |
| 8,223,296 B2 | 7/2012 | Lee et al. |
| 8,331,615 B2 | 12/2012 | Furukawa et al. |
| 8,556,491 B2 | 10/2013 | Lee |
| 8,670,019 B2 | 3/2014 | Byers |
| 8,684,588 B2 | 4/2014 | Ajichi et al. |
| 8,760,762 B1 | 6/2014 | Kelly et al. |
| 8,824,779 B1 | 9/2014 | Smyth |
| 8,908,008 B2 | 12/2014 | Tan et al. |
| 8,926,112 B2 | 1/2015 | Uchiike et al. |
| 8,942,434 B1 | 1/2015 | Karakotsios et al. |
| 9,058,765 B1 | 6/2015 | Mallick et al. |
| 9,104,908 B1 | 8/2015 | Rogers et al. |
| 9,197,884 B2 | 11/2015 | Lee et al. |
| 9,224,060 B1 | 12/2015 | Ramaswamy |
| 9,224,248 B2 | 12/2015 | Ye et al. |
| 9,288,388 B2 | 3/2016 | Son et al. |
| 9,300,916 B1 | 3/2016 | Breedvelt-Schouten et al. |
| 9,325,939 B2 | 4/2016 | Schultz et al. |
| 9,378,574 B2 | 6/2016 | Kim et al. |
| 9,470,911 B2 | 10/2016 | Fonte et al. |
| 9,489,739 B2 | 11/2016 | Kruglick |
| 9,538,130 B1 | 1/2017 | Ford et al. |
| 9,552,668 B2 | 1/2017 | Yang et al. |
| 9,619,722 B2 | 4/2017 | Takeda et al. |
| 9,626,564 B2 | 4/2017 | Rao et al. |
| 9,684,953 B2 | 6/2017 | Kuster et al. |
| 9,740,282 B1 | 8/2017 | McInerny |
| 9,749,581 B2 | 8/2017 | Nilsson et al. |

(56) References Cited

U.S. PATENT DOCUMENTS

| | | |
|---|---|---|
| 9,824,428 B2 | 11/2017 | Zhang et al. |
| 9,872,007 B2 | 1/2018 | Woodgate et al. |
| 9,986,812 B2 | 6/2018 | Yamanashi et al. |
| 10,067,562 B2 | 9/2018 | Teshome et al. |
| 10,169,905 B2 | 1/2019 | Bhat et al. |
| 10,321,747 B2 | 6/2019 | Tamura et al. |
| 10,423,830 B2 | 9/2019 | Chalom et al. |
| 10,777,018 B2 | 9/2020 | Varady et al. |
| 10,796,480 B2 | 10/2020 | Chen et al. |
| 11,026,634 B2 | 6/2021 | Brouwer et al. |
| 2001/0001566 A1 | 5/2001 | Moseley et al. |
| 2001/0050686 A1 | 12/2001 | Allen |
| 2002/0013691 A1 | 1/2002 | Warnes |
| 2002/0018299 A1 | 2/2002 | Daniell |
| 2002/0113866 A1 | 8/2002 | Taniguchi et al. |
| 2003/0117790 A1 | 6/2003 | Lee et al. |
| 2003/0133191 A1 | 7/2003 | Morita et al. |
| 2003/0137821 A1 | 7/2003 | Gotoh et al. |
| 2003/0197779 A1 | 10/2003 | Zhang et al. |
| 2003/0218672 A1 | 11/2003 | Zhang et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0066480 A1 | 4/2004 | Yoshida et al. |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0053274 A1 | 3/2005 | Mayer et al. |
| 2005/0094295 A1 | 5/2005 | Yamashita et al. |
| 2005/0104878 A1 | 5/2005 | Kaye et al. |
| 2005/0110980 A1 | 5/2005 | Maehara et al. |
| 2005/0135116 A1 | 6/2005 | Epstein et al. |
| 2005/0180167 A1 | 8/2005 | Hoelen et al. |
| 2005/0190180 A1 | 9/2005 | Jin et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0276071 A1 | 12/2005 | Sasagawa et al. |
| 2005/0280637 A1 | 12/2005 | Ikeda et al. |
| 2006/0002678 A1 | 1/2006 | Weber et al. |
| 2006/0012845 A1 | 1/2006 | Edwards |
| 2006/0056166 A1 | 3/2006 | Yeo et al. |
| 2006/0067573 A1 | 3/2006 | Parr et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0215244 A1 | 9/2006 | Yosha et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0267040 A1 | 11/2006 | Baek et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0019882 A1 | 1/2007 | Tanaka et al. |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2007/0244606 A1 | 10/2007 | Zhang et al. |
| 2007/0279554 A1 | 12/2007 | Kowarz et al. |
| 2007/0279727 A1 | 12/2007 | Gandhi et al. |
| 2008/0055221 A1 | 3/2008 | Yabuta et al. |
| 2008/0079662 A1 | 4/2008 | Saishu et al. |
| 2008/0084519 A1 | 4/2008 | Brigham et al. |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0259643 A1 | 10/2008 | Ijzerman et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316303 A1 | 12/2008 | Chiu et al. |
| 2008/0316768 A1 | 12/2008 | Travis |
| 2009/0016057 A1 | 1/2009 | Rinko |
| 2009/0040426 A1 | 2/2009 | Mather et al. |
| 2009/0052796 A1 | 2/2009 | Furukawa et al. |
| 2009/0067156 A1 | 3/2009 | Bonnett et al. |
| 2009/0109705 A1 | 4/2009 | Pakhchyan et al. |
| 2009/0128735 A1 | 5/2009 | Larson et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Minaño et al. |
| 2009/0168459 A1 | 7/2009 | Holman et al. |
| 2009/0174840 A1 | 7/2009 | Lee et al. |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0225380 A1 | 9/2009 | Schwerdtner et al. |
| 2009/0244072 A1 | 10/2009 | Pugach et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0002169 A1 | 1/2010 | Kuramitsu et al. |
| 2010/0033558 A1 | 2/2010 | Horie et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0091093 A1 | 4/2010 | Robinson |
| 2010/0091254 A1 | 4/2010 | Travis et al. |
| 2010/0103649 A1 | 4/2010 | Hamada |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0309296 A1 | 12/2010 | Harrold et al. |
| 2010/0321953 A1 | 12/2010 | Coleman et al. |
| 2010/0328438 A1 | 12/2010 | Ohyama et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0044056 A1 | 2/2011 | Travis et al. |
| 2011/0044579 A1 | 2/2011 | Travis et al. |
| 2011/0051237 A1 | 3/2011 | Hasegawa et al. |

(56) References Cited

U.S. PATENT DOCUMENTS

| | | |
|---|---|---|
| 2011/0063465 A1 | 3/2011 | Nanu et al. |
| 2011/0115997 A1 | 5/2011 | Kim |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0199460 A1 | 8/2011 | Gallagher |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0286525 A1 | 11/2011 | Kamisli et al. |
| 2011/0292321 A1 | 12/2011 | Travis et al. |
| 2011/0305374 A1 | 12/2011 | Chou |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Krijn et al. |
| 2012/0063166 A1 | 3/2012 | Panagotacos et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0105486 A1 | 5/2012 | Lankford et al. |
| 2012/0106193 A1 | 5/2012 | Kim et al. |
| 2012/0114201 A1 | 5/2012 | Luisi et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0219180 A1 | 8/2012 | Mehra |
| 2012/0223956 A1 | 9/2012 | Saito et al. |
| 2012/0236133 A1 | 9/2012 | Gallagher |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0314145 A1 | 12/2012 | Robinson |
| 2012/0319928 A1 | 12/2012 | Rhodes |
| 2012/0327101 A1 | 12/2012 | Blixt et al. |
| 2012/0327172 A1 | 12/2012 | El-Saban et al. |
| 2013/0070046 A1* | 3/2013 | Wolf .............. G06F 3/013 382/190 |
| 2013/0076853 A1 | 3/2013 | Diao |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0155063 A1 | 6/2013 | Solem et al. |
| 2013/0156265 A1 | 6/2013 | Hennessy |
| 2013/0163659 A1 | 6/2013 | Sites |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0265625 A1 | 10/2013 | Fäcke et al. |
| 2013/0294684 A1 | 11/2013 | Lipton et al. |
| 2013/0307831 A1 | 11/2013 | Robinson et al. |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0002586 A1 | 1/2014 | Nourbakhsh |
| 2014/0009508 A1 | 1/2014 | Woodgate et al. |
| 2014/0016354 A1 | 1/2014 | Lee et al. |
| 2014/0016871 A1* | 1/2014 | Son .............. G06T 15/04 382/154 |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |
| 2014/0126238 A1 | 5/2014 | Kao et al. |
| 2014/0153832 A1 | 6/2014 | Kwatra et al. |
| 2014/0240344 A1 | 8/2014 | Tomono et al. |
| 2014/0240828 A1 | 8/2014 | Robinson et al. |
| 2014/0267584 A1 | 9/2014 | Atzpadin et al. |
| 2014/0340728 A1 | 11/2014 | Taheri |
| 2014/0344718 A1 | 11/2014 | Rapaport et al. |
| 2014/0368602 A1 | 12/2014 | Woodgate et al. |
| 2015/0077526 A1 | 3/2015 | Kim et al. |
| 2015/0116212 A1 | 4/2015 | Freed et al. |
| 2015/0177447 A1 | 6/2015 | Woodgate et al. |
| 2015/0243035 A1 | 8/2015 | Narasimha et al. |
| 2015/0268479 A1 | 9/2015 | Woodgate et al. |
| 2015/0269737 A1 | 9/2015 | Lam et al. |
| 2015/0278599 A1* | 10/2015 | Zhang ............ G06V 40/19 348/78 |
| 2015/0334365 A1 | 11/2015 | Tsubaki et al. |
| 2015/0339512 A1 | 11/2015 | Son et al. |
| 2016/0125227 A1 | 5/2016 | Soare et al. |
| 2016/0196465 A1 | 7/2016 | Wu et al. |
| 2016/0211001 A1 | 7/2016 | Sun et al. |
| 2016/0219258 A1 | 7/2016 | Woodgate et al. |
| 2017/0134720 A1 | 5/2017 | Park et al. |
| 2017/0195662 A1 | 7/2017 | Sommerlade et al. |
| 2017/0364149 A1* | 12/2017 | Lu ................. G06F 3/013 |
| 2018/0035886 A1* | 2/2018 | Courtemanche ..... A61B 5/0205 |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1696788 A | 11/2005 |
| CN | 1826553 A | 8/2006 |
| CN | 1900785 A | 1/2007 |
| CN | 1908753 A | 2/2007 |
| CN | 101029975 A | 9/2007 |
| CN | 101049028 A | 10/2007 |
| CN | 101114080 A | 1/2008 |
| CN | 101142823 A | 3/2008 |
| CN | 101266338 A | 9/2008 |
| CN | 102012742 A | 4/2011 |
| CN | 102147079 A | 8/2011 |
| CN | 103310186 A | 9/2013 |
| EP | 0653891 A1 | 5/1995 |
| EP | 0830984 A2 | 3/1998 |
| EP | 0860729 A2 | 8/1998 |
| EP | 0939273 A1 | 9/1999 |
| EP | 1394593 A1 | 3/2004 |
| EP | 2219067 A1 | 8/2010 |
| EP | 2451180 A2 | 5/2012 |
| GB | 2405542 | 2/2005 |
| JP | H10142556 A | 5/1998 |
| JP | 2003215705 A | 7/2003 |
| JP | 2005181914 A | 7/2005 |
| JP | 2006010935 A | 1/2006 |
| JP | 2007094035 A | 4/2007 |
| JP | 2007109255 A | 4/2007 |
| JP | 2007273288 A | 10/2007 |
| JP | 2008204874 A | 9/2008 |
| JP | 2010160527 A | 7/2010 |
| JP | 2012060607 A | 3/2012 |
| JP | 2013015619 | 1/2013 |
| KR | 20090932304 | 12/2009 |
| KR | 20110006773 A | 1/2011 |
| KR | 20110017918 A | 2/2011 |
| KR | 20120049890 A | 5/2012 |
| RU | 2493601 C1 | 9/2013 |
| WO | 1994006249 A1 | 3/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001061241 A1 | 8/2001 |

(56) References Cited

FOREIGN PATENT DOCUMENTS

| WO | 2007111436 A1 | 10/2007 |
|---|---|---|
| WO | 2011020962 A1 | 2/2011 |
| WO | 2011148366 A1 | 12/2011 |
| WO | 2012158574 A1 | 11/2012 |
| WO | 2016132148 A1 | 8/2016 |

OTHER PUBLICATIONS

Cao et al., "Real-Time High-Fidelity Facial Performance Capture." ACM Transactions on Graphics (SIGGRAPH 2015).
Cao et al., "Realtime Multi-Person 2D Pose Estimation using Part Affinity Fields." IEEE/CVPR 2017.
CN-201680028919.9—Notification of the 1st Office Action dated Nov. 4, 2020 of China Patent Office.
CN-201780006239.1—Notification of the 1st Office Action dated Sep. 30, 2020 of China Patent Office.
Ekman et al., "Facial Action Coding System: A Technique for the Measurement of Facial Movement.", Consulting Psychologists Press, Palo Alto, 1978.
Marschner et al., "Fundamentals of Computer Graphics.", A K Peters/CRC Press; 4 edition (Dec. 15, 2015).
Paysan et al. "A 3D Face Model for Pose and Illumination Invariant Face Recognition.", 6th IEEE International Conference on Advanced Video and Signal based Surveillance (AVSS) for Security, Safety and Monitoring in Smart Environments, 2009.
Redmon et al., "YOLO9000: Better, Faster, Stronger", IEEE/CVPR, 2017.
Yip, "Face and Eye Rectification in Video Conference Using Artificial Neural Network", IEEE International Conference on Multimedia and EXPO, 2005. ICME 2005. Amsterdam, the Netherlands, Jul. 6-8, 2005, IEEE, Piscataway, NJ, USA, Jul. 6, 2005 (Jul. 6, 2005), pp. 690-693,XP010844250,DOI: 10.1109/ICME.2005. 1521517ISBN: 978-0-7803-9331-8 the whole document.
Zheng et al., "Conditional Random Fields as Recurrent Neural Networks.", International Conference on Computer Vision (ICCV), 2015.
Bahadur, "Liquid crystals applications and uses," World Scientific, vol. 1, pp. 178 (1990).
Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography. html [retrieved-on Jan. 17, 2017].
Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].
Ian Sexton et al: "Stereoscopic and autostereoscopic displaysystems",—IEEE Signal Processing Magazine, May 1, 1999 (May 1, 1999 ), pp. 85-99, XP055305471, Retrieved from the Internet: RL:http://ieeexplore.ieee.org/iel5/79/16655/00768575.pdf [retrieved on Sep. 26, 2016].
International search report and written opinion of international searching authority for PCT application PCT/US2018/045648 dated Oct. 16, 2018.
Kalantar, et al. "Backlight Unit With Double Surface Light Emission," J. Soc. Inf. Display, vol. 12, Issue 4, pp. 379-387 (Dec. 2004).
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].
Lucio et al: "RGBD Camera Effects", Aug. 1, 2012 (Aug. 1, 2012), XP055335831, Sibgrapi—Conference on Graphics, Patterns and Images Retrieved from the Internet: URL:https://www.researchgate.net/profile/Leandro Cruz/ publication/233398182 RGBD Camera Effects/links/0912f50a2922010eb2000000.pdf [retrieved on Jan. 17, 2017].
Marjanovic, M., "Interlace, Interleave, and Field Dominance," http://www.mir.com/DMG/interl.html, pp. 1-5 (2001).
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19719 (2009).
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
Bucila et al., "Model compression", Proceedings of the Twelfth ACM SIGKDD International Conference on Knowledge Discovery and Data Mining: Aug. 20-23, 2006, Philadelphia, PA USA, New York, NY: ACM Press, 2 Penn Plaza, Suite 701 New York, NY 10121-0701 USA, Aug. 20, 2006 (Aug. 20, 2006), pp. 535-541.
EP-18844651.2 European Partial Search Report of European Patent Office dated May 3, 2021.
Yim et al., "A Gift from Knowledge Distillation: Fast Optimization, Network Minimization and Transfer Learning", 2017 IEEE Conference on Computer Vision and Pattern Recognition (CVPR), IEEE Computer Society, US, Jul. 21, 2017 (Jul. 21, 2017), pp. 7130-7138.
Sun et al., "Construction and compression of face models for multi-party videoconferencing with multi-camera", 2013 6th International Congress on Image and Signal Processing (CISP), IEEE, vol. 2, Dec. 16, 2013 (Dec. 16, 2013), pp. 948-952.
Hinton et al., "Distilling the Knowledge in a Neural Network", CORR (ARXIV), vol. 1503.02531v1, Mar. 9, 2015 (Mar. 9, 2015), pp. 1-9.
Luo et al., "Face Location in Wavelet-Based Video Compression for High Perceptual Quality Videoconferencing", IEEE Transactions on Circuits and Systems for Video Technology, Institute of Electrical and Electronics Engineers, US, vol. 6, No. 4, Aug. 1996(Aug. 1996).
Katsigiannis et al., "A GPU based real-time video compression method for video conferencing", 2013 18th International Conference on Digital Signal Processing (DSP), IEEE, Jul. 2013 (Jul. 2013), pp. 1-6.
Cootes et al., "Active Appearance Models", IEEE Trans. Pattern Analysis and Machine Intelligence, 23(6):681-685, 2001.
Cootes et al., "Active Shape Models—Their Training and Application" Computer Vision and Image Understanding 61(1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
EP-17736268.8 European Extended Search Report of European Patent Office dated Jul. 12, 2019.
Ganin, et al., "DeepWarp: Photorealistic Image Resynthesis for Gaze Manipulation", Jul. 25, 2016 (Jul. 25, 2016), XP055295123, Retrieved from the Internet: URL:http://arxiv.org/pdf/1607.07215v2.pdf [retrieved on Jan. 10, 2018].
Giger, et al., "Gaze Correction with a Single Webcam", published in: Proceedings of IEEE ICME 2014 (Chengdu, China, Jul. 14-18, 2014).
Ho, "Random Decision Forests", Proceedings of the 3rd International Conference on Document Analysis and Recognition, Montreal, QC, pp. 278-282, Aug. 14-16, 1995.
International Search Report and Written Opinion dated Apr. 18, 2017 in International Patent Application No. PCT/US17/12203.
International Search Report and Written Opinion dated Oct. 16, 2018 in International Patent Application No. PCT/US18/45648.
Kononenko, et al., "Learning To Look Up: Realtime Monocular Gaze Correction Using Machine Learning", Computer Vision and Pattern recognition, pp. 4667-4675, 2015.
Lowe, "Distinctive Image Features from Scale-Invariant Keypoints", International Journal of Computer Vision 60 (2), pp. 91-110, 2004.
Ozuysal et al., "Fast Keypoint recognition in Ten Lines of Code", Computer Vision and Pattern Recognition, pp. 1-8, 2007.

(56) References Cited

OTHER PUBLICATIONS

PCT/RU2016/000118 International Preliminary Report on Patentability dated Sep. 26, 2017.
PCT/RU2016/000118 International search report and written opinion of international searching authority dated Aug. 25, 2016.
Ren, et al., Face alignment at 3000 fps via regressing local binary features. In CVPR, pp. 1685-1692, 2014.
Saffari et al., "On-line Random Forests", 3rd IEEE ICCV Workshop, On-line Computer Vision, 2009.
Sahoo et al., "Online Deep Learning: Learning Deep Neural Networks on the Fly", School of Information Systems, Singapore Management University (https://arxiv.org/abs/1711.03705), 2017, pp. 1-9.
Smith, et al., Gaze locking: passive eye contact detection for human-object interaction. In Proceedings of the 26th annual ACM symposium on User interface software and technology, pp. 271-280. ACM, 2013.
Viola and Jones, "Rapid Object Detection using a Boosted Cascade of Simple Features", pp. 1-9 CVPR 2001.
Xiong, et al., "Supervised descent method and its applications to face alignment", In Computer Vision Pattern Recognition (CVPR), 2013 IEEE Conference on, pp. 532-539. IEEE, 2013.
Yang, "Mutli-scale recognition with DAG-CNNs", ICCV 2015.
Zach et al., "A Duality Based Approach for Realtime TV-L1 Optical Flow", Pattern Recognition (Proc. DAGM), 2007, pp. 214-223.
Chi et al., "Hybrid Particle and Kalman Filtering for Pupil Tracking in Active IR Illumination Gaze Tracking System", Hindawi Publishing Corporation, vol. 2014, Article ID 426234, 17 pages, 2014.
Chou et al., "Face-off: Automatic Alteration of Facial Features", Department of Information Management National Taiwan University of Science and Technology, pp. 1-16, 2012.
Funes-Mora et al., "Gaze Estimation in the 3D Space Using RGB-D Sensors", Idiap Research Institute, Switzerland, pp. 1-23, Nov. 13, 2015.
Guo et al., "Automatic landmark annotation and dense correspondence registration for 3D human facial images", BMC Bioformatics 2013, 14:232, pp. 1-12, 2013.
Hu et al., A hierarchical dense deformable model for 3D face reconstruction form skull, Article in Multimedia Tools and Applications, Springer Science + Business Media, vol. 64: pp. 345-364, May 2013.
Jain et al., "Learning Human Pose Estimation Features with Convolutional Networks", arXiv: 1312.7302v6, [cs.CV], pp. 1-11, Apr. 23, 2014.
Kang et al., "Combining random forest with multi-block local binary pattern feature selection for multiclass head pose estimation", The Department of Electronics Engineering, Ewha W. University, Seoul, Republic of Korea, PLOS ONE, pp. 1-24, Jul. 17, 2017.
Kisku et al., "Multithread Face Recognition in Cloud", Hindawi Publishing Corporation, Journal of Sensors, vol. 2016, Article ID 2575904, 21 pages, 2016.
Lin et al., "Real-time eye-gaze estimation using a low-resolution webcam", Springer Science + Business Media, LLC, Multimed Tools Appln (2013) 65:543-568, published online Aug. 14, 2012.
Patil at el., "Expression invariant face recognition using semidecimated DWT, Patch-LDSMT, feature and score level fusion", Article in Applied Intelligence, pp. 1-34, Jun. 2016.
Patil et al., "3-D face recognition: Features, databases, algorithms and challenges", Article in Artificial Intelligence Review, An International Science and Engineering Journal, ISSN 0269-2821, Springer Science + Business Media Dordrecht 2015, 52 pages, Oct. 2015.
Pisharady et al., "Pose Invariant Face Recognition Using Neuro-Biologically Inspired Features", International Journa of Future Computer and Communication, vol. 1, No. 3, pp. 316-320, Oct. 2012.
Qin et al., "Eye Gaze Correction with a Single Webcam Based on Eye-Replacement", Springer International Publishing Switzerland ISVC 2015, pp. 599-609, 2015.
Regenbrecht et al., "Mutual Gaze Support in Videoconferencing Reviewed", Article in Communications of the Association for Information Systems, vol. 37, Article 45, 1-27 pages, Nov. 2015.
Sang et al., "Pose—Invariant Face Recognition via RGB-D Images", Hindawi Publishing Corporation, Computational Intelligence and Neuroscience, vol. 2016, Article ID 3563758, 9 pages, 2016.
Ucar, "Color Face Recognition Based on Steerable Pyramid Transform and Extreme Learning Machines", Hindawi Publishing Corporation, The Scientific World Journal, vol. 2014, Article ID 628494, 15 pages, 2014.
Van Der Hoest, "Eye Contact in Leisure Video Conferencing", Master Erasmus Mundus in Color in Information and Media Technology (CIMET), Gjovik University College, Master Thesis Report, pp. 1-131, Jul. 15, 2012.
Wolf et al., "An Eye for an Eye: A Single Camera Gaze-Replacement Method", The Blavatnik School of Computer Science Tel-Aviv University, 1-8 pages, 2010.

* cited by examiner

METHOD FOR CORRECTION OF THE EYES IMAGE USING MACHINE LEARNING AND METHOD FOR MACHINE LEARNING

TECHNICAL FIELD

This group of inventions refers to automatics and computing technology, in general, to the field of processing images and video data, namely to correction the image of eyes of interlocutors in the course of video chats, video conferences.

BACKGROUND ART

Presently video conferences between business partners and a video call to relatives abroad became an everyday occurrence. Choice of particular software and hardware is hindered by complexity related to lack of visual contact between the parties. This problem attracts researchers and engineers for a long time, and it is caused by the inevitable difference between the position of the camera capturing video image, and the image of a face on the screen.

The most successful presently known solutions require additional equipment, besides the webcam, such as: semi-transparent mirrors/screens, stereocameras or RGB-D cameras.

It is known in the state of art a patent application WO2011148366 «Method and system for correcting gaze offset» published on Dec. 1, 2011, applicant Ramot At Tel-Aviv University Ltd. The method comprising following steps: processing the image so as to extract location of at least one eye over the image; processing the image to replace imagery data associated with each location of each eye with replacement data, thereby providing a corrected image; and transmitting said corrected image to a display device. Disadvantage of the given method is, first, necessity to prerecord a set of imagery data with a gaze directed to the camera for each participant of the video conference before its beginning, and, secondly, unnatural fixation of the gaze direction during the video conference.

Also it is known from the state of art an article «Gaze Correction with a Single Webcam» authors: D. Giger, J. C. Bazin, a C. Kuster, T. Popa, M.

Gross, published in: Proceedings of IEEE ICME 2014 (Chengdu, China, Jul. 14-18, 2014). The specified method includes: determination of facial feature points and matching a geometrical model of the person head according to the determined facial features, projection of the image to texture of adjusted model, rotating model to a certain angle and projection of the turned model in the image, matching of the model image and the source image. Limitation of the given method are: deformation of global face proportions, necessity to prerecord a texture for shielded parts of the head (for example, chin) and requirement for graphic accelerator to achieve productivity necessary for real time system operation.

SUMMARY OF THE INVENTION

An object of the given group of inventions is correction of the image of eyes of the interlocutor during video conferences using a device including only one means for video recording (videocamera).

Technical effect of the given invention is the increase of the correction accuracy of the image of eyes with the simultaneous decrease of resources required for the process of handling a video frame.

This technical effect is attained due to a method for machine learning a predictor, used for correction of gaze orientation in the image wherein the method first obtains a plurality of pairs of images containing in each pair of images of the same person, whereas the pairs of images differ only by a gaze direction, then determines positions of eyes in each pair of images, next learns the predictor producing adjusting displacement vector field, so that for each pair of images replacement of color components in each pixel of the first image from the pair, for color components of another pixel of the first image of the pair shifted according to the displacement predicted by the predictor, results in an image as much as possible similar to the second image of the pair, and saves the predictor as a result.

A predictor of the displacement fields can take the following forms:
  a single-layer or multilayer neural network.
  at least one decision tree or an ensemble of decision trees.
  a predictor that produces a fixed displacement vector depending only on pixel position concerning the feature points of an eye.
  Any other form of predictors known in machine learning
  Eyes area in the pairs of images are brought to a pref-fixed pixel scale.

Predictor is stored in an information medium comprising a hard disk or a solid-state drive, or flash-storage, or an optical disk, or hybrid drives, or a random access memory (RAM), or a remote computer system, or a remote storage of data.

Also the specified technical effect is attained with a method for correction of a position of eyes in an image wherein the method first loads predictor, then obtains, at least, one frame with a face of a person, then determines positions of eyes of the person in the image and forms two rectangular areas closely circumscribing the eyes, and as a result replaces color components of each pixel in the eye areas for color components of a pixel shifted according to prediction of the predictor.

The predictor is trained according the above described criterion (to minimize the difference between the actual and the obtained images for the second image in each training pair).

The predictor is loaded from an information medium which can comprise a hard disk or a solid-state drive, or a flash-storage, or an optical disk, or hybrid drives, or a random access memory (RAM), or a remote computer system, or a remote data storage.

Predictor is a single-layer or a multilayer neural network.
Predictor is at least an one decision tree or an ensemble of decision trees.

After training the predictor applied to each pixel in the eyes area should fulfil the following requirements:
  a. When applied to a pixel, the predictor should produce adjusting displacement vector for the replacement of the color components of the given pixel by color components of another pixel determined by the given displacement vector;
  b. Predictor is trained on plurality of pairs of images where one of the images in a pair contains an initial image of the persons face before adjustment of the eyes, and the other image contains an image of a person with the eyes gazing in a different direction.

The displacement vector predicted by the predictor is scaled according to the ratio of sizes of eyes in the adjusted image to the training images.

DETAILED DESCRIPTION OF EMBODIMENTS

Concepts and definitions required for the detailed disclosure of the present invention will be described below.

Predictor is a program or hardware implementation for the comparison with samples of given certain objects (for example class labels, scalar or vector values) which depends on a considerable number of the parameters trained by means of machine learning procedure on a training plurality. A decision tree, a neural network, a set of decision trees can be given as examples of predictor architectures. Depending on the predictor, parameters can include, for example, the weights of a neural network, the threshold values in decision trees, etc.

The internal state of a predictor is a set of all parameters value of a predictor that affect its predictions.

Decision trees are a method of representation rules in a hierarchical, consecutive structure where a unique node (a tree leaf) gives a solution for each object.

Color components are three or four values in a tuple of numbers which defines a color model for description of colors representation.

There are many various types of color models, but computer graphics, as a rule, uses the following color spaces: CMY, CMYK, CMYK256, RGB, HSB, HLS, L*a*b, YIQ, Grayscale (Shades of grey).

For example, in the most known color model RGB, the tuple contains three color components. For example: (255, 64, 23) is a color containing a strong red component, a smaller amount of green and even smaller amount of blue.

The given invention can be implemented on a computer in form of a system or on a machine-readable medium containing instructions for execution of the aforementioned method.

Figure 1:
FIG. 1 shows a correction of the image of eyes of an interlocutor in real time. At the left there is an input frame with a gaze directed ten degrees below the camera. In the middle there is an input frame with a gaze directed ten degrees above than in the left frame (in this case, gaze is directed into the camera). The right frame is an instance of effect of the invention in which the gaze direction of the interlocutor in the image is adjusted ten degrees upwards in relation to the input image (shown on the left).
Figure 3:
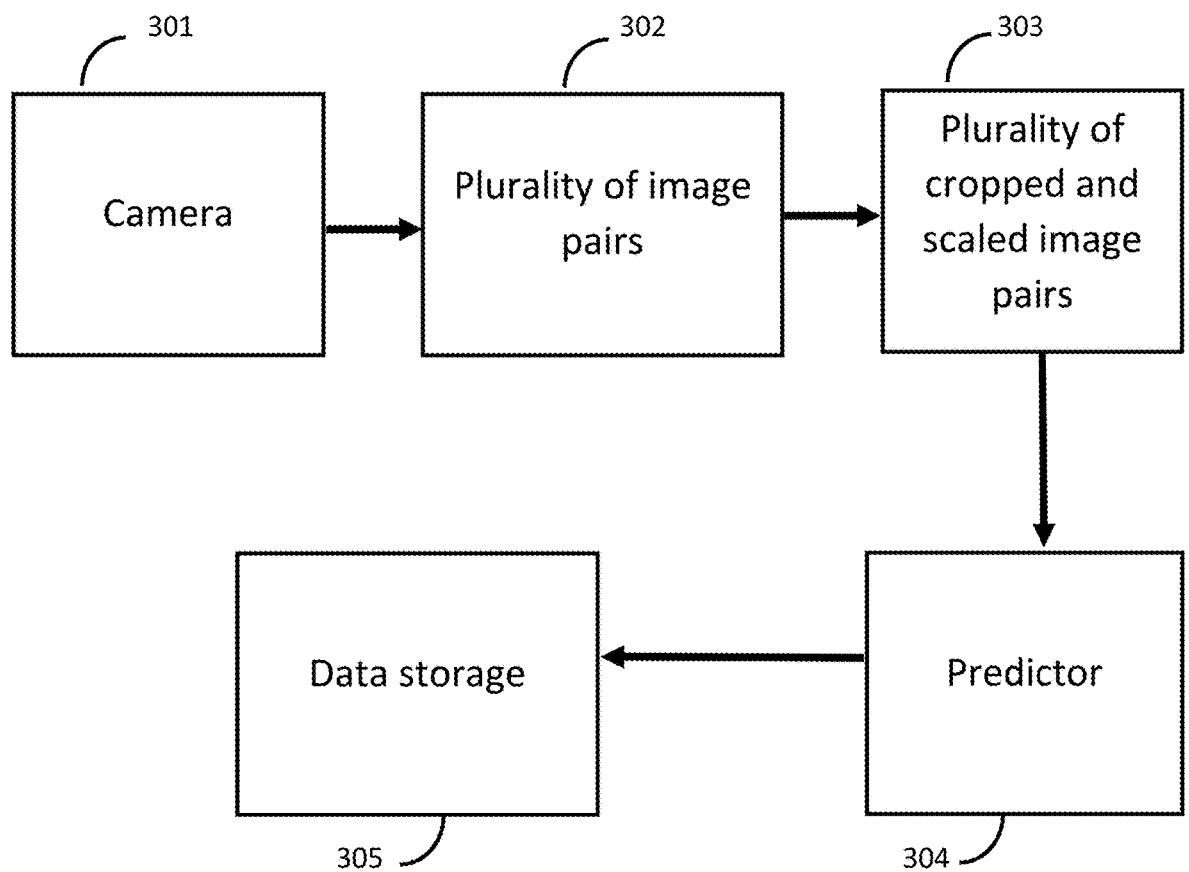
FIG. 3 shows a block diagram of a method for machine learning of the predictor used for the correction of the image of eyes.

Method of machine learning of the predictor used for correction of gaze orientation in the image, including following steps:

Gaining a Plurality of Pairs of Images Containing in Each Pair Images of the Same Person, Different Only by Gaze Direction;

Plurality of pairs of images 302 (FIG. 3) arrives from a videocamera 301 (FIG. 3). To provide a possibility of machine learning a predetermined set of pairs of images ($I_j$, $O_j$) is required fulfilling the following requirements: each pair of images represents a face of the same person, in the same position of a head and equal conditions of visualization, differing only by gaze direction of this person (FIG. 1). Difference in gaze direction is equal in all learning pairs. The given difference in gaze direction should be from 5 to 20 degrees for the correct operation of the method.

Defining positions of eyes for each pair of images;

An algorithm of controlled gradient descent, which description can be found in the reference article [1], can be used for the determination of a position of eyes, for example. Also methods can be used based on consecutive application of decision trees. Various alternatives in implementation of the specified methods are described in articles [2] and [3].

Further, images are brought to equal size. For each pair of images matching to the right eye, focusing is made on points $(f_1, g_1), (f_2, g_2) \ldots (f_N, g_N)$, matching to this eye in the image $I_j$. In article [1] number of points N is 6. It is obvious that it is not a fixed parameter. Further, axes-aligned rectangles B' bounding points of each eye are determined, and a characteristic radius $\Delta$ is defined as $\sqrt{Area(B')}$. Further a rectangle B is considered having a center in the same position, as B', and also width W and height H which are proportional to $\Delta$ (i.e. $W=\alpha*\Delta$, and $H=\beta*\Delta$ for some constants $\alpha$ and $\beta$). Constants $\alpha$ and $\beta$ are selected arbitrarily in the range from 1 to 20. In the conducted experiments, values $\alpha$ and $\beta$ were 2.0 and 1.6 accordingly. Thus, the rectangle B is covariant to scale and eye position, and has a ratio of sides $\alpha$, $\beta$. Images $I^j$ and $O^j$ are trimmed according to rectangle B and scaled in $R/^\Delta$ times so that characteristic radius of eyes in the images becomes constant, Images for the left eye are treated similarly after regular reflection relative vertical axis. As a result a plurality of trimmed and scaled pairs of images 303 was obtained (FIG. 3).

learning the predictor producing adjusting displacement vector so that for each pair of images replacement of color components in each pixel of the first image from the pair, for color components of another pixel of the first image of the pair shifted according to prediction of the predictor, results in an image as similar as possible to the second image of the pair;

In each pixel (x,y) value $O^j(x,y)$ is replaced with the value $I^j(x,y)$ by means of operation $O(x,y)=I(x+u(x,y),y+v(x,y))$. Thus, each pixel (x,y) within the bounding rectangle B specifies learning of a tuple $S=\{(x,y), I, \{f_i,g_i\}, O(x,y)\}$, which includes a (x,y) pixel position, an input image I, points on the outline of eyes $\{f_i,g_i\}$ and the color O(x,y) of pixel in the output image. Then decision trees are learned on the basis of educational tuples (learning samples).

Each learning sample does not include a displacement vector (u(x,y),v(x,y)) and includes only required color O(x, y) while the same color components can be obtained by means of various offsets.

The image of eyes is adjusted by the application a machine-trained predictor 304 (FIG. 3) in each pixel in the eyes area, and predictor P is determined by the following two properties:

(1) At handling pixel by a predictor P a displacement vector is predicted, which is used according to the correction procedure to replace the intensity (color components) of this pixel with intensity (color components) of the shifted pixel.

(2) During training, for the plurality of pairs of images (im1, im2), the application of P should lead to the conversion of im1 into im2, where im1 contains an input image and im2 contains the required image.

saving the predictor;

Depending on the type of the predictor (a decision tree, a set of decision trees, a neural network) the parameters of the given predictor are stored in an information medium 305 (FIG. 3) which is a hard disk or a solid-state drive, or an optical drive, or a flash-storage. Also a predictor can be saved in a random access memory (RAM).

For example, if a decision tree is used as a predictor the parameters can be: characteristics of tests, threshold values τ, connections between the nodes, number of leaves, depth of a tree, values of nodes, a full topology of the tree.

Method of correction an eye image comprises:

loading a predictor;

Depending on a predictor 404 type (FIG. 4) (a decision tree, a set of decision trees, a neural web), parameters of the given predictor are loaded from an information medium 403 (FIG. 4) which can be a hard disk or a solid-state drive, or an optical drive, or a flash-storage. Also predictor can be loaded from a random access memory (RAM).

For example, if a decision tree is used as a predictor the parameters can be: characteristics of tests, threshold values τ, connections between the nodes, number of leaves, depth of a tree, values of nodes, a full topology of the tree.

obtaining at least one frame of a person's face;

Images can be transmitted in form of stream video arriving from a source of video data 401 (FIG. 4) in real time or from a storage, from a local video server or a central server. For transmission of the stream video standard protocols RTSP (RealTimeStreamingProtocol), RTMP (RealTimeMessagingProtocol), HLS (HTTPLiveStreaming) and DASH (DynamicAdaptiveStreamingover HTTP) can be used. Thus speed and quality of transmitted video data can automatically adapt for a device communications channel.

Video data can be transmitted in compressed form, for example, by means of coders H.264, VP8, MJPEG, JPEG, JPEG2000.

Figure 4:
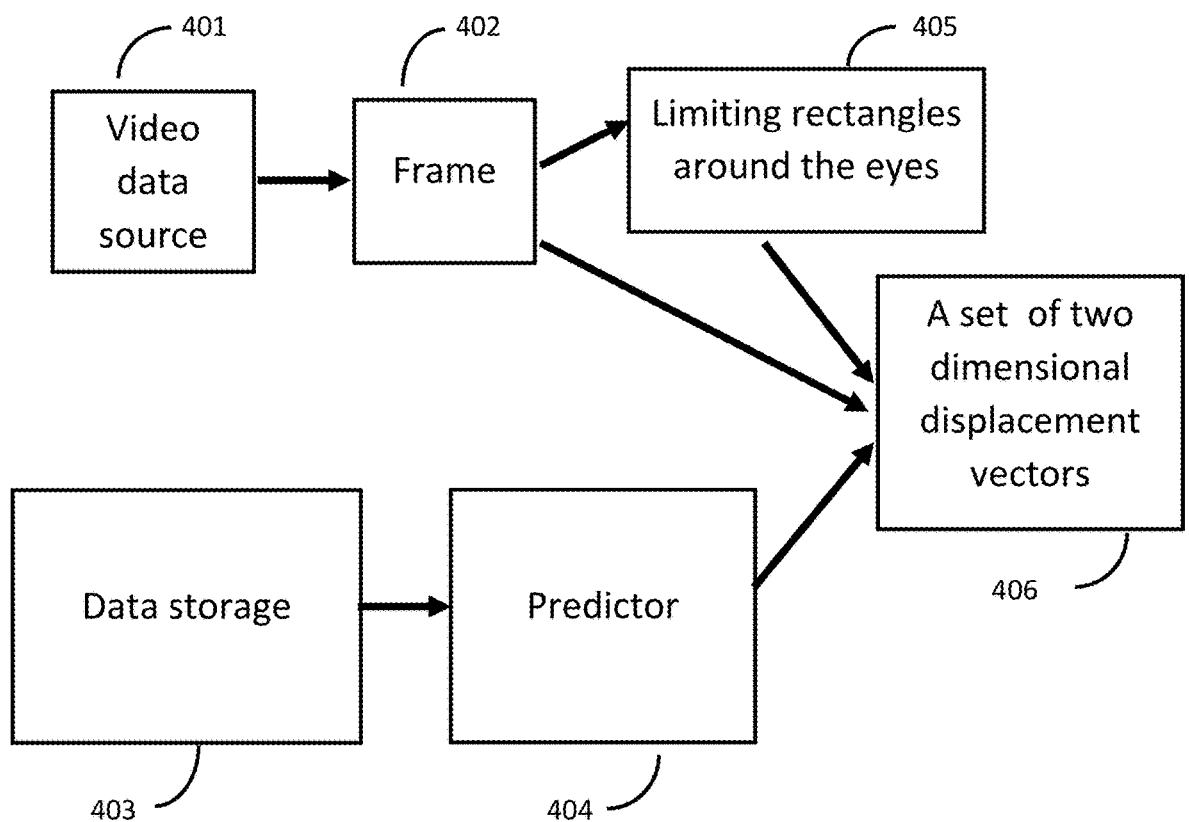
FIG. 4 shows a block diagram of a method for correction of the image of eyes.

Video data can be transmitted in the form of separate files. Thus standard containers, for example, WebM, OGV, MKV, MP4, TS, JPG and others can be used, Video data can be transmitted on wireless webs, such as GSM (Global System for Mobile Communications), CDMA (Code division multiple access), LTE (Long Term Evolution), Wi-Fi (Wireless Fidelity). In some implementations of the present invention obtaining and/or sending data is carried out with usage of the several technologies described above or reception/transmission technologies, defining positions of person's eyes in the image and two rectangular areas closely circumscribing the eyes;

Each eye focuses on points $(f_1, g_1), (f_2, q_z) \ldots (f_N, g_N)$, matching this eye which are allocated on an eye outline. Further, axes aligned rectangles bounding B' points of each eye are determined, and a characteristic radius $\Delta$ is defined as $\sqrt{\text{Area}(B')}$. Further considered is a rectangle B having a center in the same position, as B', and also width W and height H which are proportional $\Delta$ (i.e. $W=\alpha*\Delta$, and $H=\beta*\Delta$ for some constants $\alpha$ and $\beta$). Thus, the rectangle B is covariant to scale and eye position, and has a ratio of sides $\alpha:\beta$.

replacing color components of each pixel in the eyes area with color components of the pixel shifted according to the prediction of the predictor;

After determining bounding rectangles 405 (FIG. 4) around the eyes, color components of pixels are changed for the redirection of the gaze. The given step of the method is fulfilled by means of machine learning by the usage of the predictor 404 (FIG. 4). As a result of matching pixels in rectangles of input images and images in a learning set, a two-dimensional (2-D) displacement vector $(u(x,y),v(x,y))$ is obtained at $(x,y)$ pixel coordinates. The final value of pixels $o(x,y)$ in the output image is computed by the formula $O(x,y)=I(x+u(x,y),y+v(x,y))$. Thus, a set of two-dimensional vectors of offsets 406 (FIG. 4) is obtained for each pixel of a bounding rectangle 405 (FIG. 4) around the eyes.

Figure 2:
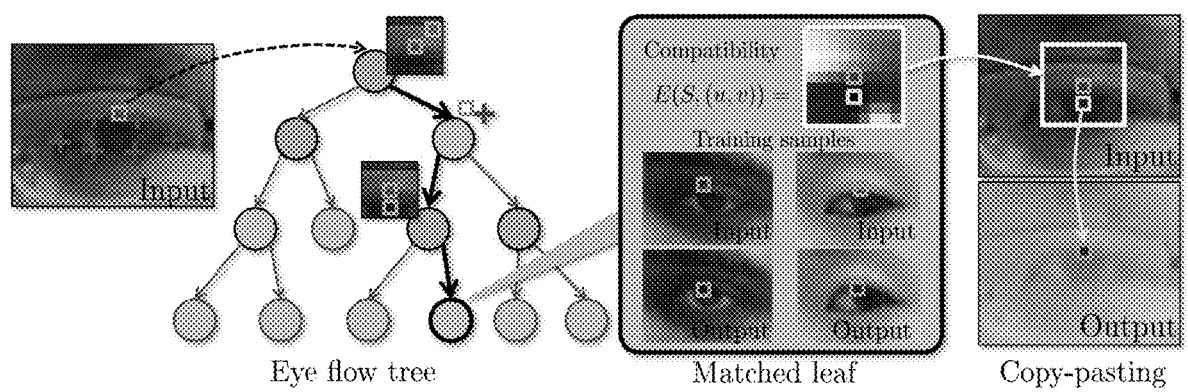
FIG. 2 shows a pixel handling in case the predictor is a decision tree.

In more details (FIG. 2), a predictor (in this case a decision tree)matches each pixel $(x,y)$ to the learning data and thus determines the offset. As a pixel is passed through the given tree, it is sequentially subjected to two types of tests. In each non-leaf node of the randomized decision tree a type of test which is applied to pixel is determined. The test of the first type (an appearance test) is determined by an offset (dx, dy) in one of the channels {R; G; B} and a threshold value τ, and within the frames of this test a difference of two values of pixels in this color channel is compared to the threshold value as follows $$I(x+dx, y+dy)[c] - I(x, y)[c] \gtreqless \tau.$$

The test of the second type (the test for position of pixel with respect to the feature point) is determined by the number of the feature point $i \in \{1, \ldots N\}$ and the threshold value τ, and within the frames of this test either $x-f_i$ or $y-g_i$ is compared to threshold value c as follows:

$$x - f_i \gtreqless \tau \text{ or } y - g_i \gtreqless \tau.$$

Each of the leaves contains unnormalized offset error distribution which are referenced as compatibility maps. In each pixel of a compatibility card there is a summarized difference between true color components of the pixel in the output image and color components of the pixel in the input image, shifted on (u, v). If this difference is small enough, it is possible to approach the pixel in the output image by the pixel in the input image after shift on (u, v).

Total number of the applied tests depends on depth of the decision tree, and the type of the presently applied test depends on the node type in which we are present at the moment.

In order to increase the accuracy of correction a set of several independently learned decision trees can be applied. For a given pixel, each tree predicts a compatibility map (recorded in the corresponding leaf of the tree). The compatibility maps from different trees are then summed together, which allows to estimate the compatibility map typical for the given type of pixels more accurately. For the aggregated compatibility map, the most compatible shift for the given type of pixels is selected (as a position of the minimum on the map). This value (u, v) is used for conducting operation on recovery $O(x,y)=I(x+u(x,y),y+v(x,y))$.

The present detailed specification is composed with presenting various embodiments having no limitative and exhaustive character. At the same time, for a person skilled in the art it is obvious that various replacements, modifications or combinations of any embodiments disclosed here (also partially) can be reproduced within the scope of the present invention. Thus, it is meant and it is clear that the present specification of the invention includes additional alternatives of the embodiments which essence is not stated here in explicitly expressed form. Such embodiments can be obtained in result of, for example, combinations, modifications or conversions of any actions, components, devices, properties, aspects, performances, restrictions and so forth, referring to the given here and not having limitative character embodiments.

REFERENCES

1. X. Xiong and F. De la Torre. Supervised descent method and its applications to face alignment. In Computer Vision and Pattern Recognition (CVPR), 2013 IEEE Conference on, pages 532-539. IEEE, 2013.
2. B. A. Smith, Q. Yin, S. K. Feiner, and S. K. Nayar. Gaze locking: passive eye contact detection for human-object interaction. In Proceedings of the 26th annual ACM symposium on User interface software and technology, pages 271-280. ACM, 2013.
3. S. Ren, X. Cao, Y. Wei, and J. S. 0001. Face alignment at 3000 fps via regressing local binary features. In CVPR, pages 1685-1692, 2014.

The invention claimed is:

1. A method for image enhancement on a computing device, the method comprising: receiving a digital input image depicting a person's face; generating a gaze-adjusted image from the digital input image by changing a gaze direction of eyes on the person's face via a gaze adjustment machine learning model, wherein the gaze adjustment machine learning model comprises a predictor is obtained by:
obtaining a plurality of learning pairs of images containing in each pair of images views of a same person, the learning pairs of images differing by a gaze direction, and wherein, for the learning pairs of images, the difference in gaze direction in each image in the learning pair is equal;
determining positions of eyes in each of the learning pair of images; and
determining the predictor for producing adjusting displacement vector fields for each learning pair of images by replacing color components of each pixel of the first image from the pair, with color components of another pixel of the first image of the pair according to a prediction of the predictor, resulting in an image similar to the second image of the pair; and
outputting the gaze-adjusted image.

2. The method of claim 1, wherein the predictor is a single-layer or multilayer neural network.

3. The method of claim 1, wherein the predictor is at least one decision tree or an ensemble of decision trees.

4. The method of claim 1, wherein the gaze direction between the learning pairs of images differs by an angle in the range of 5 to 20 degrees.

5. The method of claim 1, wherein the predictor produces a fixed displacement vector depending on pixel position concerning a plurality of characteristic points of an eye.

6. The method of claim 1, wherein the predictor is based on a plurality of learning pairs of images containing views of a same person.

7. The method of claim 1, wherein for all learning pairs of images, the difference in gaze direction in each image in the learning pair is the same.

8. The method of claim 1, wherein the method further comprises loading the predictor from an information medium on which the predictor is stored, the information medium comprising one of a hard disk, a solid-state drive, a flash-storage, an optical disk, a hybrid drive, a random access memory (RAM), a remote computer system, and a remote storage of data.

9. The method of claim 1, wherein generating the gaze-adjusted image includes identifying a plurality of landmarks in the digital input image.

10. The method of claim 9, wherein generating the gaze-adjusted image further includes, based on the plurality of landmarks, generating a two-dimensional displacement vector field indicating, for each of one or more pixels in the digital input image, a displacement vector for the pixel, and generating the gaze-adjusted image by displacing the one or more pixels in the digital input image according to the two-dimensional displacement vector field.

11. The method of claim 1, where the digital input image is one frame of a video stream including a plurality of frames.

12. A computing device, comprising:
a logic machine; and
a storage machine holding instructions executable by the logic machine to:
receive a digital input image depicting a human eye;
generate a gaze-adjusted image from the digital input image by changing an apparent gaze direction of the human eye via a gaze adjustment machine learning model, wherein the gaze adjustment machine learning model comprises a predictor is obtained by:
obtaining a plurality of learning pairs of images containing in each pair of images views of a same person, the learning pairs of images differing by a gaze direction, and wherein, for the learning pairs of images, the difference in gaze direction in each image in the learning pair is equal;
determining positions of eyes in each of the learning pair of images; and
determining the predictor for producing adjusting displacement vector fields for each learning pair of images by replacing color components of each pixel of the first image from the pair, with color components of another pixel of the first image of the pair according to a prediction of the predictor, resulting in an image similar to the second image of the pair;
and output the gaze-adjusted image.

13. The computing device of claim 12, wherein generating the gaze-adjusted image includes, based on a plurality of landmarks identified in the digital input image, generating a two-dimensional displacement vector field indicating, for each of one or more pixels in the digital input image, a displacement vector for the pixel, and generating the gaze-adjusted image by displacing the one or more pixels in the digital input image according to the two-dimensional displacement vector field.

* * * * *